United States Patent
Goldberg et al.

(10) Patent No.: US 10,379,880 B2
(45) Date of Patent: Aug. 13, 2019

(54) RECOVERING MISSED DISPLAY ADVERTISING

(71) Applicant: International Business Machines Corporation, Armonk, NY (US)

(72) Inventors: Itzhack Goldberg, Hadera (IL); Etai Lev-Ran, Nofit (IL); Idan Zach, Givat Ela (IL)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 15/275,413

(22) Filed: Sep. 25, 2016

(65) Prior Publication Data

US 2018/0088759 A1    Mar. 29, 2018

(51) Int. Cl.
*G06F 3/048* (2013.01)
*G06F 9/451* (2018.01)
*G06Q 30/02* (2012.01)
*G06F 3/0481* (2013.01)

(52) U.S. Cl.
CPC ............ *G06F 9/451* (2018.02); *G06F 3/0481* (2013.01); *G06Q 30/0277* (2013.01)

(58) Field of Classification Search
CPC .... G06F 9/451; G06F 3/0481; G06Q 30/0277
See application file for complete search history.

(56) References Cited

U.S. PATENT DOCUMENTS

| | | | |
|---|---|---|---|
| 2002/0161780 A1 | 10/2002 | Dutta et al. | |
| 2010/0057558 A1 | 3/2010 | Yano | |
| 2013/0219345 A1* | 8/2013 | Saukko | G06F 1/1626 715/863 |
| 2013/0332262 A1 | 12/2013 | Hunt et al. | |
| 2014/0168255 A1* | 6/2014 | Rydenhag | G06T 11/00 345/619 |
| 2015/0025981 A1 | 1/2015 | Zaretsky et al. | |
| 2017/0090727 A1* | 3/2017 | Mashino | G06F 3/04842 |
| 2017/0192649 A1* | 7/2017 | Bakken | G06F 3/04842 |
| 2018/0018071 A1* | 1/2018 | Chabrier | G06F 9/451 |
| 2018/0024723 A1* | 1/2018 | Vecera | G06F 9/451 |

OTHER PUBLICATIONS

"Contextual advertising"., Contextual advertising Wikipedia, the free encyclopedia, 2016.

* cited by examiner

*Primary Examiner* — Andrew T Chiusano
(74) *Attorney, Agent, or Firm* — Gregory J. Kirsch

(57) ABSTRACT

Embodiments of the present invention may provide techniques by which missed interactions with display advertising may be reduced or recovered. For example, in an embodiment of the present invention, a computer-implemented method for processing computer input may comprise displaying on a display screen at least one background application and a foreground item frame, removing display of the foreground item frame, and after removing display of the foreground item frame, detecting user input in the location where the foreground item frame was displayed.

15 Claims, 4 Drawing Sheets

RECOVERING MISSED DISPLAY ADVERTISING

BACKGROUND

The present invention relates to techniques by which missed interactions with items displayed on a display screen may be reduced or recovered.

Online advertising, also called web advertising, is a form of marketing and advertising which uses the Internet to deliver promotional marketing messages to consumers. Examples of such advertising may include email marketing, search engine marketing, social media marketing, display advertising, mobile advertising, etc. Display advertising typically conveys its advertising message visually using text, logos, animations or other graphics. Display advertisers frequently target users with particular traits to increase their ads' effectiveness. One exemplary delivery method for display advertisement is the floating ad (or overlay ad), which is a type of rich media advertisement that appears superimposed over the requested website's content. Floating ads may disappear or become less obtrusive after a preset time period.

Often, a user misses the advertisement (or the application/window) due to a missed button effect. For example, if a user is "too slow" in responding to the ad display, they may click on the relevant item, such as a button in the ad, or the ad itself, or the app, etc., after the item has disappeared form the display. As a result, the user's click may be interpreted as occurring in the context of the displayed website content, instead of the advertisement context. This may be confusing to the user and may result in lost opportunities or lost income for the advertiser.

Accordingly, a need arises for a technique by which such missed interaction with display advertising may be reduced or recovered.

SUMMARY

Embodiments of the present invention may provide techniques by which missed interactions with display advertising may be reduced or recovered. For example, in an embodiment, a user may be given the option to go back to the previous item, such as an advertisement, app, window, etc., by bringing it back again in some form, such as a small frame, small icon, etc., so the user may again have the opportunity to select the item.

For example, in an embodiment of the present invention, a computer-implemented method for processing computer input may comprise displaying on a display screen at least one background application and a foreground item frame, removing display of the foreground item frame, and after removing display of the foreground item frame, detecting user input in the location where the foreground item frame was displayed. The method may further comprise after detecting the user input in the location where the foreground item frame was displayed, determining an action to take. The determined action may comprise at least one action selected from a group comprising: re-displaying the foreground item frame, forwarding the user to a location that clicking on the foreground item frame would have navigated to, and ignoring the click. The user input in the location where the foreground item frame was displayed may be detected for a time period after removing display of the foreground item frame. The time period may comprise at least one time period selected from a group comprising: a predetermined time period and a time period determined based on user behavior. The method may further comprise determining that a user has clicked ahead, and forwarding the user to a location of a desired item.

In an embodiment of the present invention, a computer program product for processing computer input may comprise a non-transitory computer readable storage having program instructions embodied therewith, the program instructions executable by a computer, to cause the computer to perform a method may comprising displaying on a display screen at least one background application and a foreground item frame, removing display of the foreground item frame, and after removing display of the foreground item frame, detecting user input in the location where the foreground item frame was displayed.

In an embodiment of the present invention, a system for processing computer input may comprise a processor, memory accessible by the processor, and computer program instructions stored in the memory and executable by the processor to perform displaying on a display screen at least one background application and a foreground item frame, removing display of the foreground item frame, and after removing display of the foreground item frame, detecting user input in the location where the foreground item frame was displayed.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present invention may provide techniques by which missed interactions with items displayed on a display screen may be reduced or recovered. For example, in an embodiment, a user may be given the option to go back to the previous item, such as an advertisement, app, window, etc., by bringing it back again in some form, such as a small frame, small icon, etc., so the user may again have the opportunity to select the item.

Figure 1:
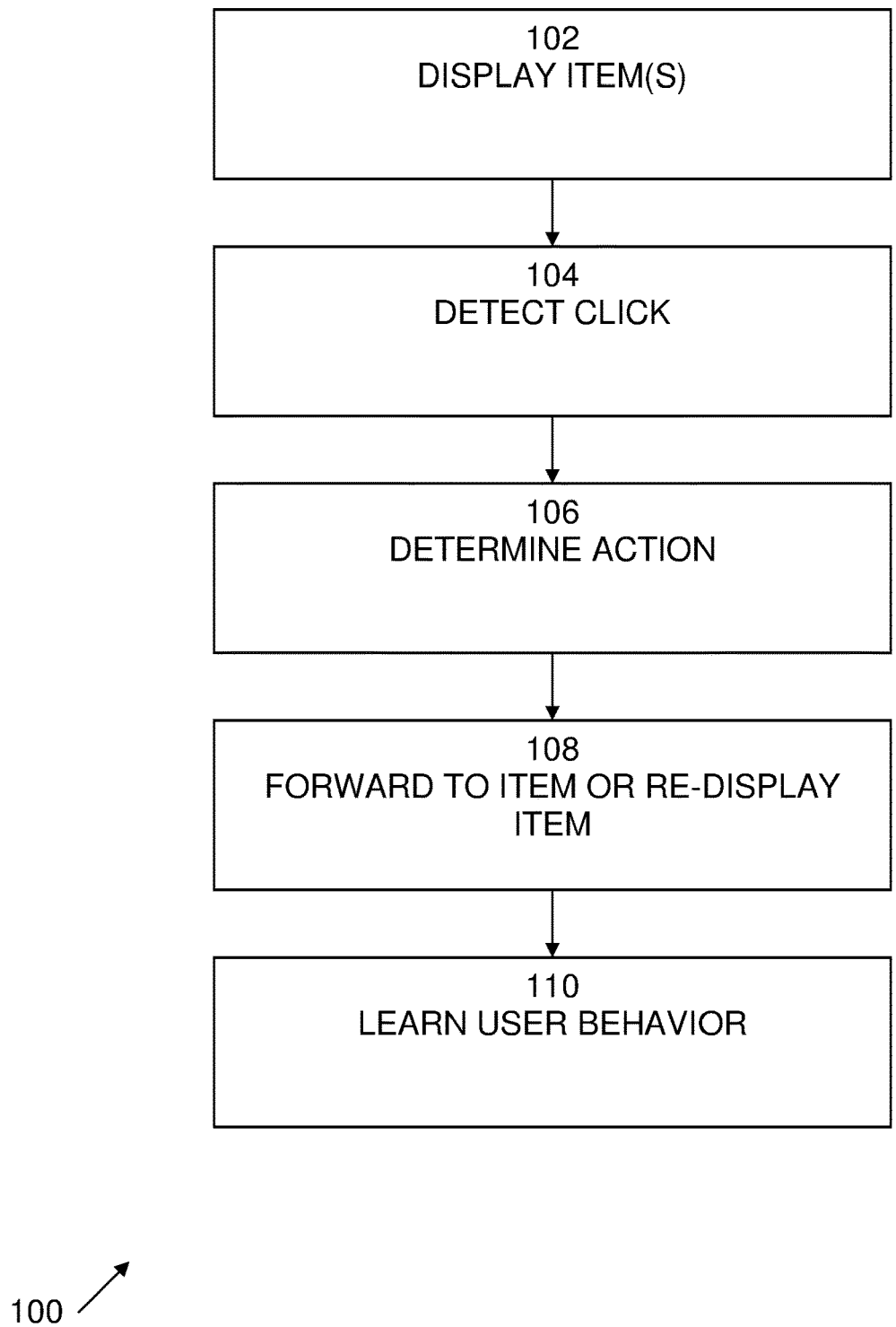
FIG. 1 is an exemplary flow diagram of a process according to an embodiment of the present invention.
Figure 2:
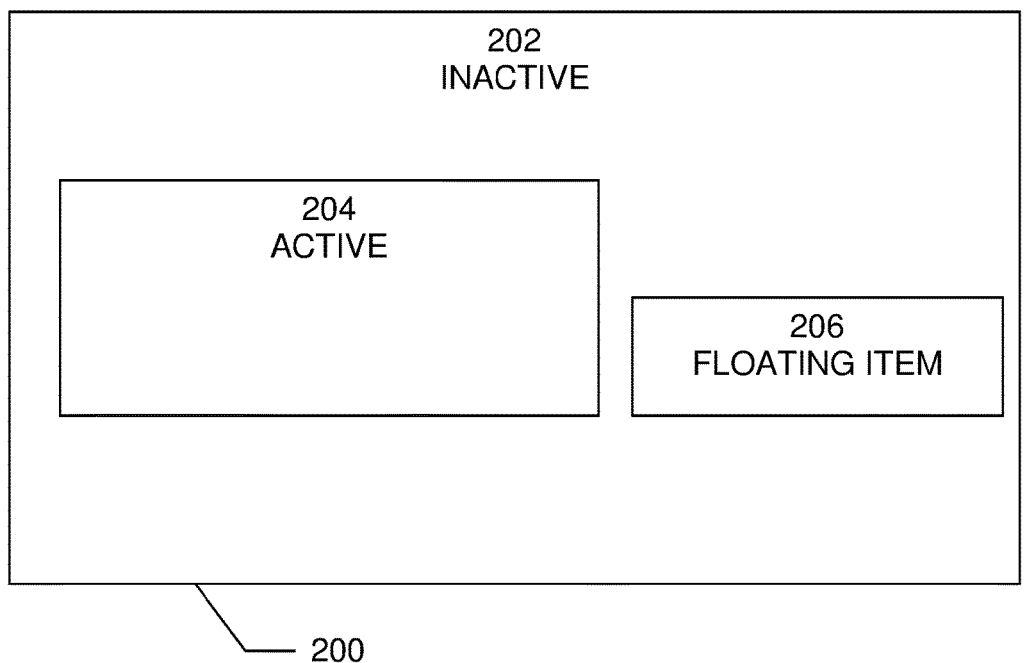
FIG. 2 is an exemplary display in which embodiments of the present invention may be implemented.

An exemplary flow diagram of a process 100 according to an embodiment of the present invention is shown in FIG. 1. Process 100 begins with 102, in which items are displayed to a user. For example, as shown in FIG. 2, a display area 200, which may be a display screen or a portion of a display screen, may include an inactive area 202, an active frame 204, and a floating item frame 206, which may be displayed. Typically, the inactive area 202 may be displayed or controlled by a background application, which is inactive in terms of accepting user input, while a foreground application is displaying an active frame 204. An application, such as an embedded application attached to the foreground application, may display the floating item frame 206 so that there is no overlapping between the floating item frame 206 and the active frame 204 of the foreground application, displaying active frame 204. Typically, the floating item frame 206 may only be displayed for a time, and then may disappear from the display.

At 104, a click by the user is detected and its location determined. At 106, the action to be taken based on the detected click is determined. For example, at 104, it may be determined that the user clicked, but if the floating item frame 206 disappeared before the click could be completed, then it may be determined that the user missed clicking the floating item frame 206 or on a button in the floating item frame 206, and instead clicked on the inactive area 202 of the background application, in the location of the floating item frame 206. Then at 106, it may be determined that the user missed the button and at 108, the floating item frame 206 may be re-displayed, or the user will be forwarded the location that clicking on the floating item frame 206 would have displayed. Further, at 110, a learning agent may be used to track user behavior to improve the detection and determination actions, such as determining whether to forward to a location, re-display the floating item frame 206, or simply ignoring the user action.

In the case that the floating item frame 206 disappeared and the user clicked too quickly or by mistake on the background application are, which became the active application when the floating item frame 206, it may be determined that the user missed the button and the floating item frame 206 may be re-displayed, or the user will be forwarded the location that clicking on the floating item frame 206 would have navigated to and displayed. Again the learning agent may track the user behavior to improve determination of this case.

Missed click timing thresholds may be set in accordance with human interaction timings to allow for cases when there is no inactive area. For example, clicks within a time window smaller than human perception, for example, the time it would take a human to read the content, visually identify links and click them, may be regarded as intent to click the item that has just disappeared.

Figure 3:
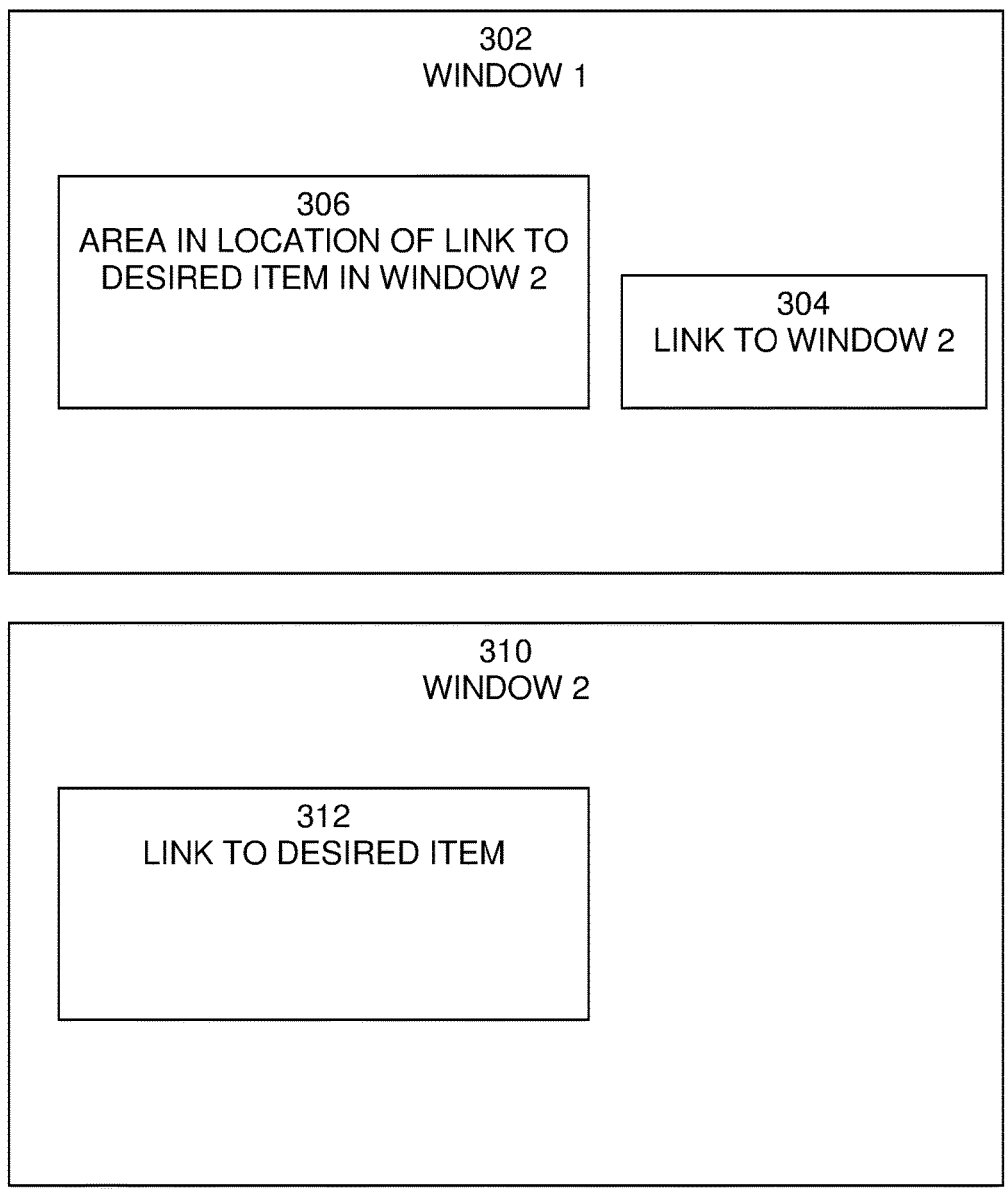
FIG. 3 is an exemplary display in which embodiments of the present invention may be implemented.

In that case that the user knows where the desired application will be shown in the next active window and types ahead, before the active window is fully displayed, the learning agent may learn the individual user tendency to do so and may forward the user to the next application window to improve the user experience. Without this technique, if the user types or clicks ahead, the second click may be ignored and the user may be required to click again when the new window appears. For example, as shown in FIG. 3, window 1 302 may be displayed and may include a link 304 to window 2 310. When a user clicks the link 304 to window 2 310, and is aware of the location to click in window 2 310 in order to click on link 312 to the desired item, the user may click on that location before window 2 310 has been displayed. In order to handle this correctly, the learning agent may monitor an area 306 in window 1 302 is in the same location in window 1 302 that the link 312 to the desired item would be displayed in window 2 310. If the user clicks in this area before window 2 is displayed, the user may be forwarded to the desired item by the learning agent monitoring the area 306. If the user clicks in this area once window 2 is displayed, the user may be forwarded to the desired item by the user clicking on the link 312 to the desired item.

Figure 4:
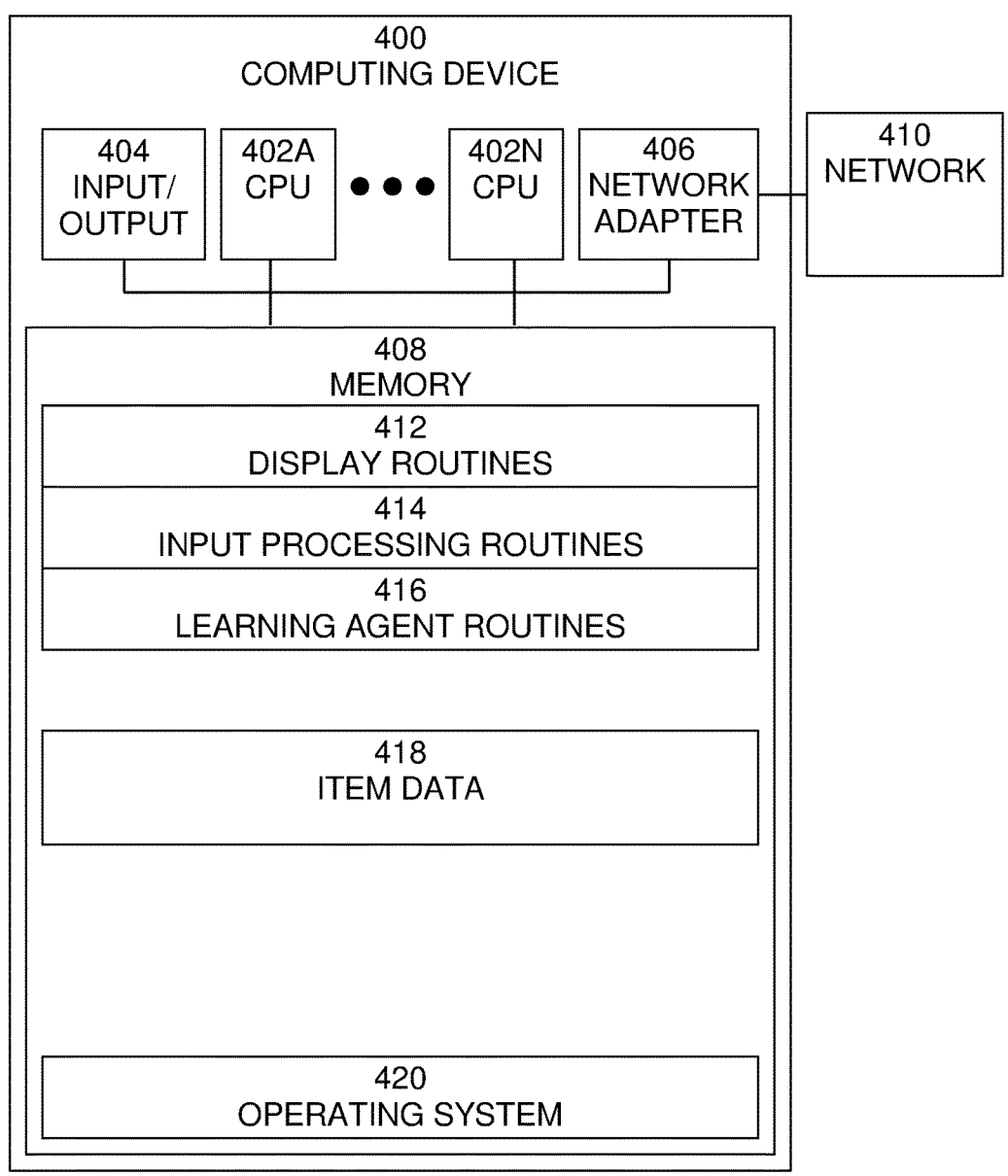
FIG. 4 is an exemplary block diagram of a computer system in which processes involved in the embodiments described herein may be implemented.

An exemplary block diagram of a computer system 400, in which processes involved in the embodiments described herein may be implemented, is shown in FIG. 4. Computer system 400 is typically a programmed general-purpose computer system, such as an embedded processor, system on a chip, personal computer, workstation, server system, and minicomputer or mainframe computer. Computer system 400 may include one or more processors (CPUs) 402A-402N, input/output circuitry 404, network adapter 406, and memory 408. CPUs 402A-402N execute program instructions in order to carry out the functions of the present invention. Typically, CPUs 402A-402N are one or more microprocessors, such as an INTEL PENTIUM® processor. FIG. 4 illustrates an embodiment in which computer system 400 is implemented as a single multi-processor computer system, in which multiple processors 402A-402N share system resources, such as memory 408, input/output circuitry 404, and network adapter 406. However, the present invention also contemplates embodiments in which computer system 400 is implemented as a plurality of networked computer systems, which may be single-processor computer systems, multi-processor computer systems, or a mix thereof.

Input/output circuitry 404 provides the capability to input data to, or output data from, computer system 400. For example, input/output circuitry may include input devices, such as keyboards, mice, touchpads, trackballs, scanners, etc., output devices, such as video adapters, monitors, printers, etc., and input/output devices, such as, modems, etc. Network adapter 406 interfaces device 400 with a network 410. Network 410 may be any public or proprietary LAN or WAN, including, but not limited to the Internet.

Memory 408 stores program instructions that are executed by, and data that are used and processed by, CPU 402 to perform the functions of computer system 400. Memory 408 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 408 may vary depending upon the function that computer system 400 is programmed to perform. However, one of skill in the art would recognize that the illustrated routines, along with the memory contents related to those routines, may be included on one system or device, or may be distributed among a plurality of systems or devices, based on well-known engineering considerations. The present invention contemplates any and all such arrangements.

In the example shown in FIG. 4, memory 408 may include display routines 412, input processing routines 414, learning agent routines 416, item data 418, and operating system 420. For example, display routines 412 may include routines to generate and display windows, frames, etc., using item data 418. Input processing routines 414 may include routines to receive user input, detect clicks, determine click location, and determine an action to take. Learning agent routines 416 may include routines to track user behavior to improve the detection and determination actions. Operating system 420 provides overall system functionality.

As shown in FIG. 4, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method for processing computer input comprising:
    displaying on a display screen at least one background application and a foreground item frame;
    removing display of the foreground item frame;
    after removing display of the foreground item frame, detecting user input in the location where the foreground item frame was displayed, and
    after detecting the user input in the location where the foreground item frame was displayed, determining an action to take, wherein the determined action comprises at least one action selected from a group comprising: re-displaying the foreground item frame, and forwarding the user to a location that clicking on the foreground item frame would have navigated to, wherein the user input in the location where the foreground item frame was displayed is detected for a time period after removing display of the foreground item frame.

2. The method of claim 1, wherein the time period comprises at least one time period selected from a group comprising: a predetermined time period and a time period determined based on user behavior.

3. The method of claim 1, further comprising:
    determining that a user has clicked or typed ahead, and forwarding the user to a location of a desired item.

4. The method of claim 3, further comprising:
    using a learning agent to track user behavior to learn an individual user tendency to click or type ahead.

5. The method of claim 1, further comprising:
    using a learning agent to track user behavior to improve the detection and determination actions.

6. A computer program product for processing computer input, the computer program product comprising a non-transitory computer readable storage having program instructions embodied therewith, the program instructions executable by a computer, to cause the computer to perform a method comprising:
    displaying on a display screen at least one background application and a foreground item frame;
    removing display of the foreground item frame;
    after removing display of the foreground item frame, detecting user input in the location where the foreground item frame was displayed, and
    after detecting the user input in the location where the foreground item frame was displayed, determining an action to take, wherein the determined action comprises at least one action selected from a group comprising: re-displaying the foreground item frame, and forwarding the user to a location that clicking on the foreground item frame would have navigated to, wherein the user input in the location where the foreground item frame was displayed is detected for a time period after removing display of the foreground item frame.

7. The computer program product of claim 6, wherein the time period comprises at least one time period selected from a group comprising: a predetermined time period and a time period determined based on user behavior.

8. The computer program product of claim 6, further comprising program instructions for:
    determining that a user has clicked or typed ahead, and forwarding the user to a location of a desired item.

9. The computer program product of claim 8, further comprising:
    using a learning agent to track user behavior to learn an individual user tendency to click or type ahead.

10. The computer program product of claim 6, further comprising:
    using a learning agent to track user behavior to improve the detection and determination actions.

11. A system for processing computer input, the system comprising a processor, memory accessible by the processor, and computer program instructions stored in the memory and executable by the processor to perform:
    displaying on a display screen at least one background application and a foreground item frame;
    removing display of the foreground item frame;
    after removing display of the foreground item frame, detecting user input in the location where the foreground item frame was displayed, and
    after detecting the user input in the location where the foreground item frame was displayed, determining an action to take, wherein the determined action comprises at least one action selected from a group comprising: re-displaying the foreground item frame, and forwarding the user to a location that clicking on the foreground item frame would have navigated to, wherein the user input in the location where the foreground item frame was displayed is detected for a time period after removing display of the foreground item frame.

12. The system of claim 11, wherein the time period comprises at least one time period selected from a group comprising: a predetermined time period and a time period determined based on user behavior.

13. The system of claim 11, further comprising computer program instructions for:
    determining that a user has clicked or typed ahead, and forwarding the user to a location of a desired item.

14. The system of claim 13, further comprising:
    using a learning agent to track user behavior to learn an individual user tendency to click or type ahead.

15. The system of claim 11, further comprising:
using a learning agent to track user behavior to improve the detection and determination actions.

\* \* \* \* \*